United States Patent [19]

Takats et al.

[11] 4,345,191

[45] Aug. 17, 1982

[54] TWO/ONE (2/1) FAIL OPERATIONAL ELECTROHYDRAULIC SERVOACTUATOR

[75] Inventors: Imre J. Takats, Bellevue; Charles C. Chenoweth, Renton, both of Wash.

[73] Assignee: The Boeing Company, Seattle, Wash.

[21] Appl. No.: 175,687

[22] Filed: Aug. 5, 1980

[51] Int. Cl.³ .......................................... G05B 19/02
[52] U.S. Cl. .................................. 318/564; 244/194; 91/1; 91/363 A
[58] Field of Search ................. 91/363 A, 1; 244/194; 318/564

[56] References Cited

U.S. PATENT DOCUMENTS

| | | | |
|---|---|---|---|
| 3,670,148 | 6/1972 | Moses | 318/564 X |
| 4,130,241 | 12/1978 | Meredith et al. | 318/564 X |
| 4,159,444 | 6/1979 | Bartlett et al. | 244/194 X |
| 4,209,734 | 6/1980 | Osder | 244/194 X |

Primary Examiner—B. Dobeck
Attorney, Agent, or Firm—Delbert J. Barnard; Eugene O. Heberer; Joan H. Pauly

[57] ABSTRACT

Disclosed is a method of and apparatus to facilitate the operation of two servoactuators with a two/one (2/1) fail operational capability. In preferred embodiments, four signal processing channels are provided, two of which are active and directly control hydraulic servovalves which in turn controls the rate of operation of the servoactuators. Two other modeling channels produce an electrical output similar to the output expected from the servoactuator when supplied with the input to the active channel. The two actual rate indicative outputs and the two modeled rate indicative outputs are compared and deviations in one channel from the other three cause that channel to be declared a "failed" channel. Through a logical switching system, if an active channel has failed, the output of its associated model channel is connected to the servoactuator to continue operation of that actuator. Furthermore, after encountering one failed channel the output and operation of the three remaining channels are also compared with the result that if one of these three remaining outputs differs from the other two, its associated channel is declared as failed as well. Thus, with only two servoactuators, a two/one (2/1) fail operational servoactuator is provided.

35 Claims, 5 Drawing Figures

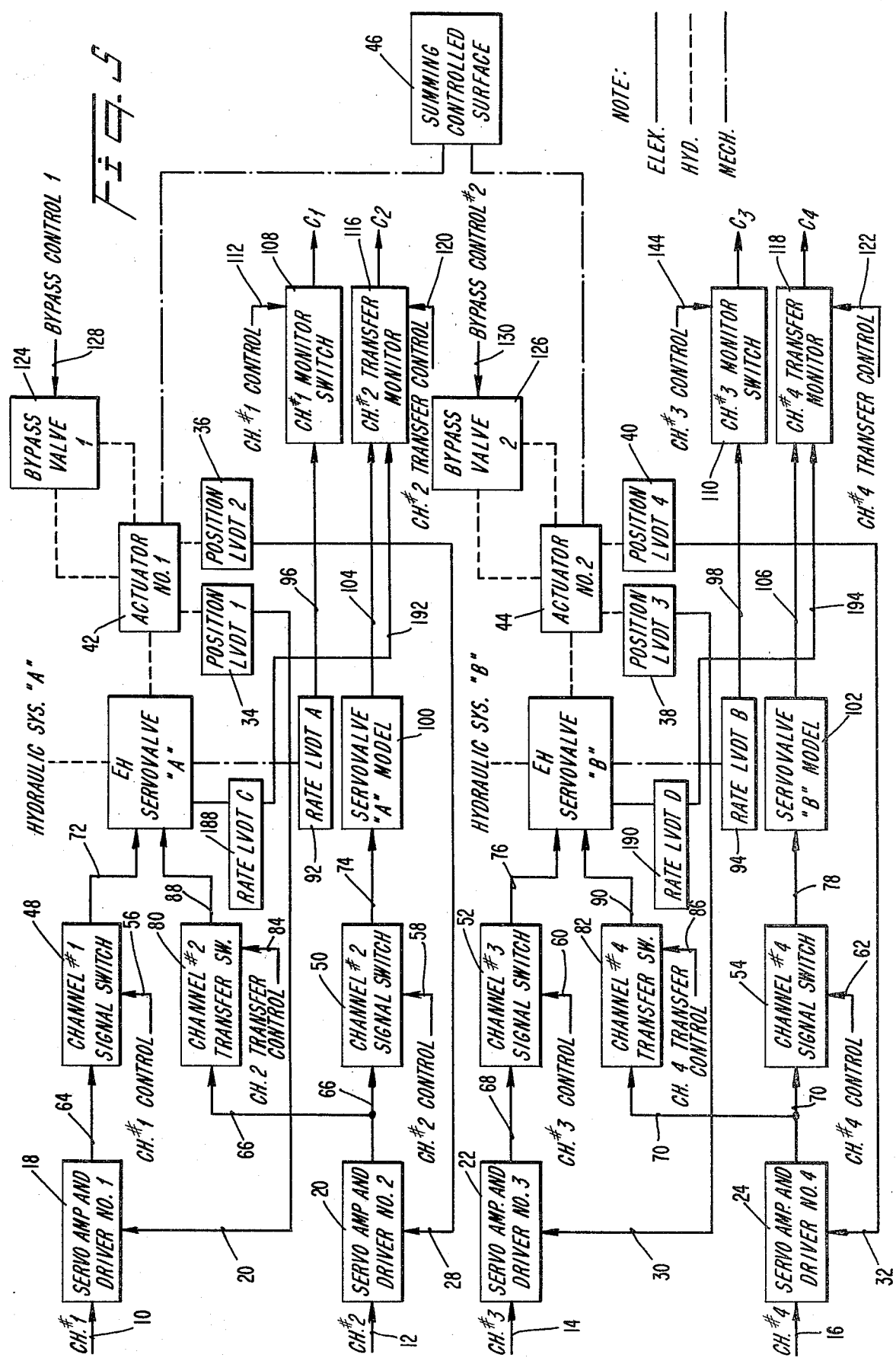

TWO/ONE (2/1) FAIL OPERATIONAL ELECTROHYDRAULIC SERVOACTUATOR

BACKGROUND OF THE INVENTION

The present invention relates generally to electrohydraulic actuation systems and specifically to a two/one (2/1) fail operational multi-redundant electrohydraulic actuation system.

Because aircraft are growing in size, weight and performance envelope, the loads which are imposed on flight control surfaces have long since increased beyond the point that simple mechanical advantage will permit direct operator control of the surface. In the past, partial boost systems have aided the aircraft pilot in controlling his machine much the same way as power-assisted steering or brakes aid an automobile driver. However, where in the event of failure of the power-assist, the loads imposed cannot be met by a pilot, then there is no advantage in having a power-assisted control surface over a completely hydraulic or electronic control system.

Many modern aircraft utilize what are referred to as fly-by-wire (FBW) controls for operation of aircraft control surfaces. Such a fly-by-wire system generally reduces control inputs by the pilot to one or more signals which are utilized to control an electrical, hydraulic, or combination electrohydraulic actuation stystem which ultimately moves the flight control surface the required amount. Obviously, in such a system, failure of any one component could have disastrous results.

Accordingly, it has become common to have several control channels and actuators such that if there is a failure in one channel/actuator system there is a second or backup system in order to maintain control of the aircraft until the problem can be corrected.

A typical one/one (1/1) fail-operational actuator system is shown in FIG. 1. Electric channels 1 and 3 provide control signals to electrohydraulic servoactuators "A" and "B", respectively. Redundant electric channels 2 and 4 provide comparison outputs to the monitor and shutdown logic system. The actual servoactuator outputs, 1 and 2, are compared in the monitor and shutdown logic circuit to the comparison outputs of electric channels 2 and 4, respectively, and in the event that there is a disparity between output 1 and electric channel 2 or output 3 and electric channel 4, monitor and shutdown logic "A" or "B" would shutdown servoactuator "A" or "B", respectively.

Thus, a failure of any one electric channel or any one servoactuator will result in the shutting down of either output 1 or output 2, hence the designation of a one/one (1/1) fail-operational actuator.

As can be seen, a failure in one of electric channel 1 or electric channel 2 or servo actuator A and one of electric channel 3, electric channel 4 or servoactuator B will result in total failure of the control system with possible loss of control of the aircraft.

One improvement upon the FIG. 1 one/one fail-operational actuator is shown in U.S. Pat. No. 3,505,929, issued Apr. 14, 1970 to Coppola, et al. Here, three active electrohydraulic actuators 2, 4, 6 and a single electronic actuator model 7 are provided along with an electronic comparator and suitable logic circuitry. One of the hydraulic actuators is considered to be an active channel and electronic control inputs are applied to it and the other two standby hydraulic actuators which move in concert with the single active channel but are not normally physically connected thereto. Detection of a failure in the active channel results in deactivation of the failed channel and immediate physical connection of one of the standby channels which assumes control. Failure of the now-active standby channel results in the last standby channel being activated accordingly. Therefore, this system can withstand as many as two channel failures with undegraded performance.

It can be seen that if the three electrohydraulic servo channels 2, 4 and 6 were monitored for a failure (as indicated by a position reading on one servoactuator which is substantially different from the position readings on the other two servo actuators) the system with two failures would be rendered inoperative (the logic assembly not knowing after a first failure, which of the remaining two electrohydraulic servo channels is good and which is failed in the event of a second failure). Therefore Coppola adds an electronic actuator model 7 which receives the same command signals as the electrohydraulic servo channels 2, 4 and 6 but utilizes electronic modeling to provide an output which is indicative of the positional output to be expected from a good electrohydraulic servo channel.

This modeled output is utilized in conjunction with the three position outputs from the servo channels which permits two failures to occur while still retaining the required degree of control. The logic circuitry utilizes "voting" among the three actuator position outputs and the modeled output such that the one output which differs from the remaining three outputs is considered failed and disconnected. Thus, regardless of whether the failed output is an actuator or a model channel, two failures can be tolerated and at all times two channels will remain for comparison (either two actuator channels or an actuator and a model channel). It should be pointed out that for this type of redundancy, three complete servoactuators are necessary as well as four electronic channels one of which including an electric model of the servoactuator.

It also has been found that it is extremely difficult to accurately model the position of a servoactuator because the position is dependent upon the aerodynamic loads, for example, imposed on the actuator and in most instances, these loads are extremely non-linear and vary greatly with aircraft speed, attitude and atmospheric conditions. Consequently, the modeling of servoactuator position requires rather sophisticated electronics in order to accurately model actuator position. Where the weight of a given aircraft takes away from its payload carrying capabilities, the penalty paid for carrying along three servoactuators and a complex computer model of a servoactuator may be unwarranted and accordingly a lesser redundancy in the control system is tolerated.

In U.S. Pat. No. 4,159,444 issued June 26, 1979 to Bartlett et al, a dual actuator system provides rate information which is compared with rate information geneated by a model and if one servoactuator channel differs substantially from the model and the other servoactuator channel the differing channel is disconnected as a failed channel. Specifically, in the FIG. 5 embodiment of the Bartlett et al patent, dual models and monitors are utilized which provide basically the redundancy outlined in the prior art discussed above with reference to FIG. 1 in the present specification. Failure of either the servoactuator or the model for that servoactuator results in the shut down of the servoactuator as failed.

Thus, there is a need for a two/one (2/1) fail-operational actuator (capable of tolerating two electric or one hydraulic failure and still maintain itself operational) with a minimum amount of additional weight and without complex position modelers.

SUMMARY OF THE INVENTION

It is an object of the present invention to provide a two/one (2/1) fail-operational electrohydraulic servoactuation system which utilizes only two servoactuators.

It is a further object of the present invention to provide a two/one (2/1) fail-operational electrohydraulic servoactuation system which eliminates the necessity of servoactuator position modeling.

It is a still further object of the present invention to provide voting among two actual rate indicative outputs and two modeled rate indicative outputs such that after encountering an output indicative of a failed channel, the channel is disconnected and voting continues among the three remaining channels permitting a further electronic channel failure with complete operational capability thereafter.

It is an additional object of the present invention to provide a method for electronic channel voting in a dual servoactuator control system such that upon determining that failure of one channel has occurred, the remaining three channels are compared and any additional channel failure still permits fail safe operation of the system.

The above and other objects are achieved by providing four independent electric channels, two of which directly control servovalves and the other two of which provide output signals to electronic rate modelers. The rate indicative outputs from the servovalves and the electronic modelers are compared in a monitor and control logic circuit which issues an output for disabling any electric channel determined to be "failed" (its output differs from the other three outputs by a predetermined amount). In a preferred embodiment, if the failed channel is one of the two channels operating the servovalves, the monitor and control logic in addition to deactivating the defective channel also energizes a transfer switch which connects the output of a modeled channel to the servovalve. The monitor and control logic also disregards the transferred channels' output and compares, for future "failure" determinations, the affected servovalve's rate indicative output with the two remaining rate indicative outputs. In the event of a further channel failure, the monitor and control logic disconnects the associated channel and continues comparing the two remaining "good" outputs.

Thus, with two servo actuators and "rate" information, and the above noted reconfiguration capability, a higher fail-operational actuation system is provided with simpler failure monitoring and with minimum hardware and weight.

BRIEF DESCRIPTION OF THE DRAWINGS

A more complete appreciation of the invention and the attendant advantages thereof will be more clearly understood by reference to the following drawings wherein:

FIG. 5 is a block diagram of a further embodiment of the present invention without the monitor and control logic.

DETAILED DESCRIPTION OF PREFERRED EMBODIMENTS

Figure 1:
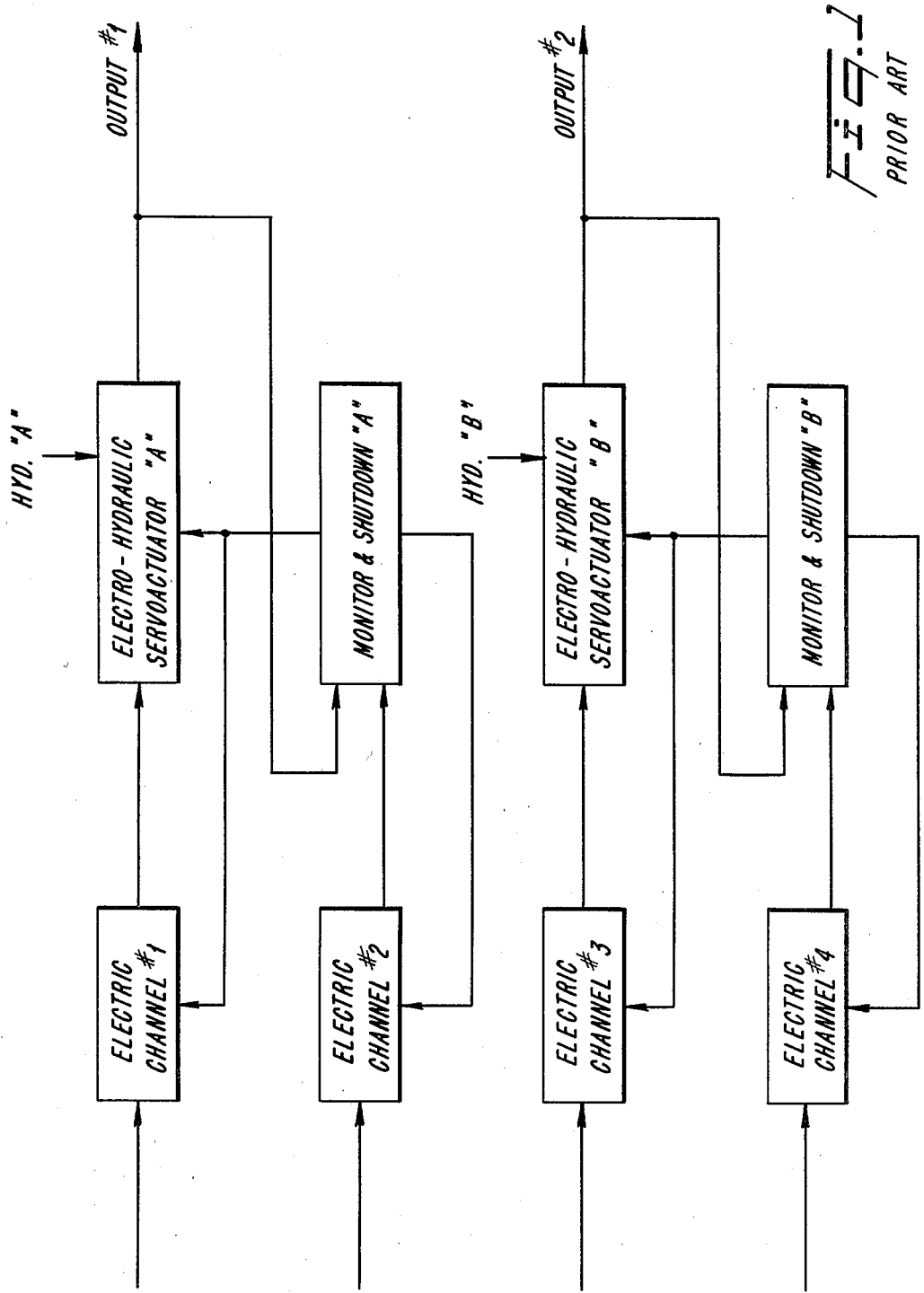
FIG. 1 is a block diagram of a prior art dual-dual concept, one/one (1/1) fail-operational actuator.
Figure 2:
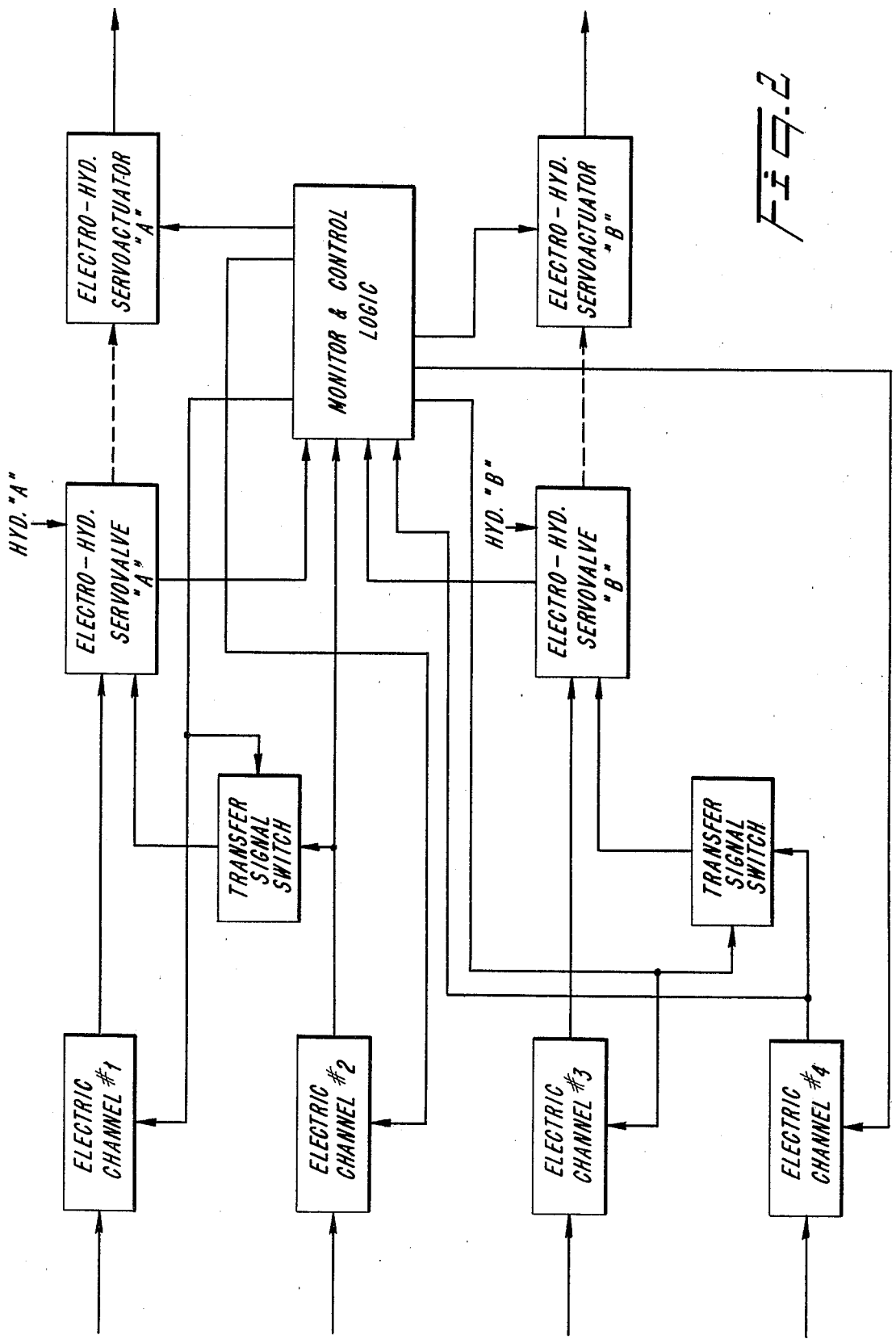
FIG. 2 is a block diagram of one embodiment of the present invention which comprises a two/one (2/1) fail-operational actuator.

Referring now to the drawings wherein like reference characters designate like parts throughout the several views, FIG. 2 depicts the operating relationship between the major functional elements in one embodiment of the present invention. Electrohydraulic servoactuators "A" and "B" are controlled by electrohydraulic servovalves "A" and "B", respectively. The amount that the servo valve is opened or closed will determine the rate at which the servoactuators change position. Servovalves "A" and "B" are connected to hydraulic systems "A" and "B", respectively. Each of the servovalves provides a rate indicative output to the Monitor and Control Logic which is compared with the outputs of electric channels 2 and 4. If one of the inputs to the monitor and control logic differs from the other three inputs by more than a predetermined amount, the Monitor and Control Logic will categorize that input as indicative of a failed channel and will provide the appropriate corrective control signal. As can be seen, outputs are provided to each channel, the transfer switch and the hydraulic servoactuator itself, in the systems associated with each of both servoactuators. For example, if either channel 1 or channel 3 "fails", the Monitor and Control Logic will provide a control signal to the channel disabling it and also to its respective transfer signal switch which has the effect of connecting either channel 2 or channel 4 to control either servovalve "A" or servovalve "B", respectively. At this point because channel 2 or channel 4 is directly controlling servovalve "A" or "B" the rate indicative output from the controlled servovalve is now indicative of the output of channel 2 or 4. Accordingly, the Monitor and Control Logic disregards the actual output of channels 2 or 4 and instead categorizes the rate indicative output from the servovalve as the output from channels 2 or 4 and ignores the fact that this rate indicative output was initially regarded as indicative of the condition of channel 1 or 3, which has subsequently failed.

If either channel 2 or channel 4 is the "failed" channel, after comparison, the Monitor and Control Logic merely disables the failed channel and its output, which was compared with the three remaining "good" channels.

In the event that both electric channels associated with servovalve "A" fail, the Monitor and Control Logic in addition to disabling the two channels, also sends a signal to servoactuator "A" opening a bypass valve or actuating a friction brake depending on whether the servoactuators are connected in parallel or in a differential summing manner, respectively. This permits the remaining servoactuator to provide proper operation without the failed actuator hindering such proper operation.

Failure of either hydraulic system or the servovalve itself would provide a rate indicative output which would differ from the remaining three outputs being compared by the Monitor and Control Logic. Because channel 1 is initially associated with the servovalve rate indicative output, the Monitor and Control Logic would operate under the assumption that electric channel 1 has failed consequently disconnecting it from the servovalve and connecting electric channel 2 thereto. However, because electric channel 2, after disconnection of electric channel 1, provides a rate indicative output directly from servovalve "A" and because this same rate indicative output (now identified with channel 2) still indicates a failed channel, the Monitor and Control Logic would shut down electric channel 2 as well and actuate the servoactuator "A" bypass or friction brake as required.

Thus, the use of four channels and the multiple "voting" among "rate" outputs thereof, combined with two separate hydraulic and servoactuator systems, provides a two/one (2/1) fail-operational servoactuator system without the necessity of three servoactuators, and a complex "position" indicative outputs. Precisely how one embodiment of the present invention operates will be reviewed with reference to FIG. 3.

Figure 3:
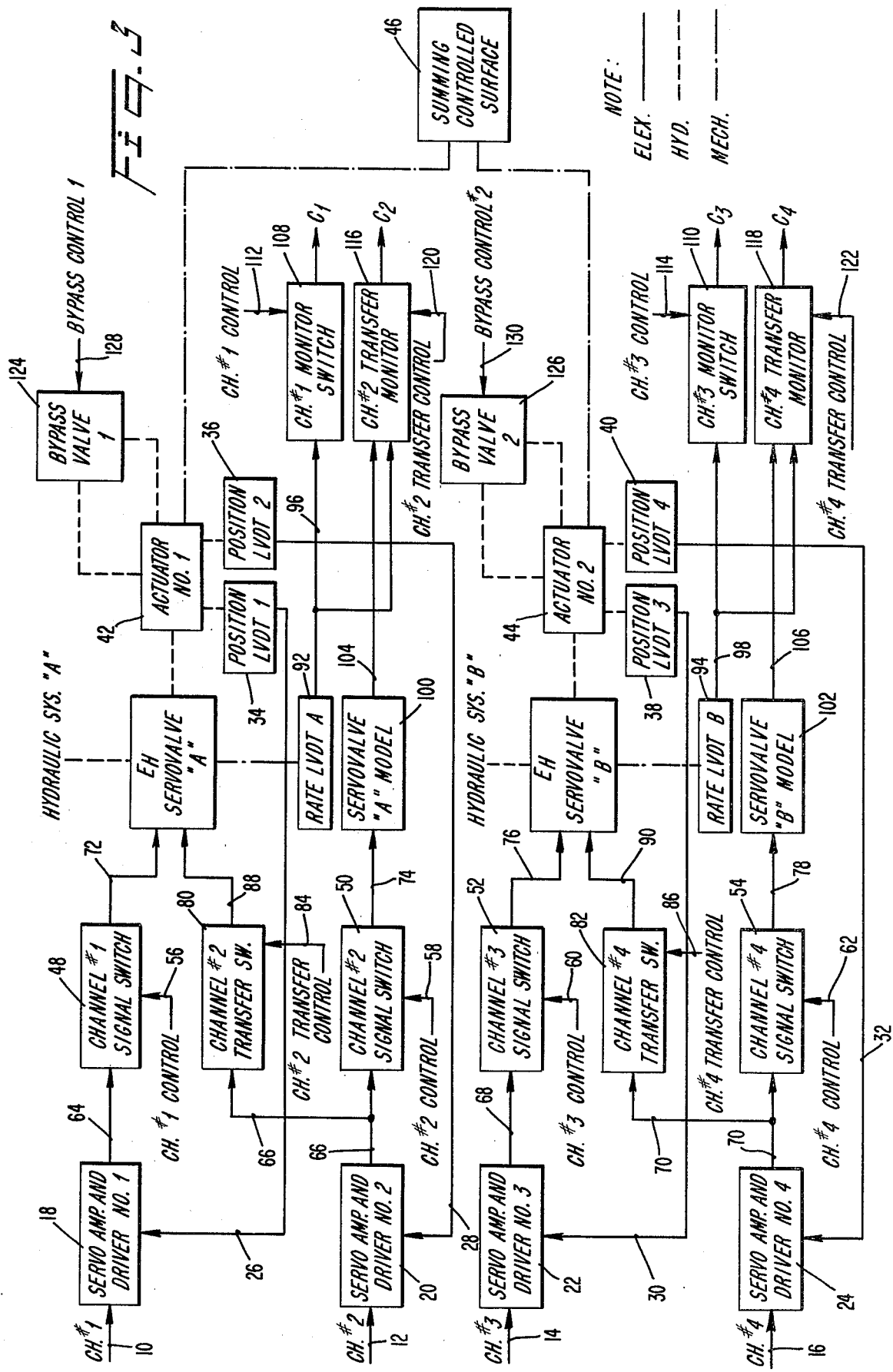
FIG. 3 is a block diagram of the present invention without the monitor and control logic.

An electrical input 10, 12, 14, 16 is supplied to channels 1, 2, 3 and 4, respectively, as shown in FIG. 3. These inputs may be electrically connected to each other or may be derived from separate, redundant control transducers, for example mounted on the pilot's control stick. Regardless of the origin of electrical inputs 10, 12, 14, 16, they are assumed to be substantially equal when applied to the inputs of servo amp and drivers 18, 20, 22 and 24. Also applied to the servo amp and drivers are actual position feedback signals 26, 28, 30, 32 which are generated, for example, by position Linear Variable Differential Transformers (LVDTs) 34, 36, 38, 40 corresponding to the four electrical channels.

As noted on FIG. 3, the solid lines indicate an electrical connection, the dotted lines indicate a hydraulic connection and the dot-dash lines indicate a mechanical connection. Each servoactuator 42 and 44, has two LVDTs mechanically connected thereto so as to provide two actual position feedback signals one for each channel associated with the actuator. As is well known in servoactuator control, the electrical input signal in each channel is compared with the actual position feedback signal and any differences therein, after being amplified, are applied so as to reposition the actuator and reduce the error to zero. Thus, each actuator is controlled by an electrical input and electrical feedback provided by the actuator output position transducer (LVDT). The actuator output may control an aerodynamic control surface or any other device whose position control is to be effected by the electrical inputs to the system.

The outputs of servo amp and drivers 18, 20, 22 and 24 are applied, respectively, to channel signal switches 48, 50, 52 and 54. Each of the signal switches 48, 50, 52, 54 has a channel control signal 56, 58, 60 and 62, respectively. Normally, the channel signal switches are closed such that they pass their respective electrical control inputs, 64, 66, 68 and 70 directly through as outputs 72, 74, 76, 78. However, upon application of an appropriate signal at channel control 56, 58, 60, 62, the channel switch will open with the result that there will be no electrical control signal at switch output 72, 74, 76, 78.

Depending upon the logic utilized in the Monitor and Control Logic group, the signal applied to channel control to cause the channel signal switches to open can be either a logic "1" or "0". Additionally, the electrical control input to the channel 2 and channel 4 signal switches 50 and 54, respectively, is also applied to channel 2 and channel 4 transfer switches, 80 and 82, respectively. The transfer switches are normally open but application of a logically appropriate transfer control signal at inputs 84 and 86 respectively, will apply the channel 2 and channel 4 electrical control inputs 66 and 70, respectively, to inputs 88 and 90 of servovalves "A" and "B", respectively.

As is also shown in FIG. 3, the channel 1 and channel 3 signal switch outputs 72 and 76 are also inputs to electrohydraulic (EH) servovalves "A" and "B".

While the servovalves "A" and "B" shown in FIG. 3 have two separate inputs (for additional redundancy) the inputs could be combined to a single input controlling the servovalve. In a preferred embodiment of the two input version shown in FIG. 3, dual coil torque motor mechanically controls a hydraulic valve which in turn controls the rate of hydraulic actuator movement. The dual coil torque motor has one coil connected to each of the servovalve inputs and is used to integrate the input commands from either channel although both channels are never operational at the same time.

In the embodiment of FIG. 3, the hydraulic valves in servovalves "A" and "B" are mechanically connected to "rate" LVDTs 92 and 94 which provide a rate indicative electrical output at 96 and 98, respectively.

In the preferred embodiment shown in FIG. 3, the output of channel 2 and channel 4 signal switches, 74 and 78, are applied to inputs of servovalve "A" and servovalve "B" models, 100 and 102, respectively. The servovalve models provide an electrical output reflective of the output which would be expected from a rate LVDT connected to a servovalve which had an input equal to the input of the model. In other words, given equal inputs to the servovalve A and servovalve A model, the rate LVDT "A" output 96 should be substantially the same as servovalve "A" model output 104. Similarly, model output 106 from servovalve "B" model 102 should be substantially similar to the output 98 of rate LVDT "B" if the input to servovalve "B" is the same as the input to servovalve "B" model 102.

One of the advantages of the present system is the simplicity of modeling the rate of servoactuator operation as compared to the complexity of modeling servoactuator position which is significantly more dependent on actuator loads which in many instances are quite variable. The electronic model of the electrohydraulic servovalve operation can comprise a zero order (linear) transfer function which provides an output signal which closely approximates the signal provided by an LVDT mechanically coupled to a valve which has had the same input control signal applied to it. Servovalve modeling and the usefulness of linear transfer functions for approximating servovalve response is well established and is further explained in Moog Technical Bulletin 103 as revised in January 1965 with Appendices I and II, available from Moog Incorporated, Controls Division, East Aurora, N.Y. 14052. Although preferred embodiments of the present invention use a zero order linear transfer function, some applications of the present invention may require the use of first or second order transfer functions to obtain proper approximations of servovalve response to the control input.

Continuing with the embodiment of FIG. 3, the rate indicative outputs 96 and 98 are applied to normally closed channel monitor switches 108 and 110, respectively such that the rate indicative outputs 96 and 98 are applied to comparison terminals $C_1$ and $C_3$, respectively. The monitor switches are supplied with control inputs 112 and 114 which upon application of a logically appropriate signal will cause the monitor switch to open disconnecting their associated comparison terminals from the rate indicative outputs of their respective LVDTs.

Channel transfer monitors 116 and 118 are associated with channels 2 and 4 and normally pass the modeled rate indicative outputs 104 and 106 from the servovalve models to comparison terminals $C_2$ and $C_4$, respectively. However, when logically appropriate transfer control signals 120 and 122 are applied to transfer monitors 116 and 118, comparison terminals $C_2$ and $C_4$ are disconnected from rate indicative outputs 104 and 106 and instead connected to rate indicative outputs 96 and 98, respectively.

The actuators 42 and 44 have bypass valves 124 and 126 hydraulically connected thereto. The bypass valves 1 and 2 are responsive to bypass control signals applied to bypass valve inputs 128 and 130, respectively. As noted earlier, the bypass valve can be electrically set in a bypass position by a logically appropriate bypass valve input in order to prevent hydraulic locking when the associated hydraulic system has failed or both of its associated electrical channels have failed. As noted earlier, if it is desirable to restrain the actuator in the event of failure of both related electrical channels or the related hydraulic system, the bypass valve input will cause the valve to assume a position which promotes hydraulic locking of the servoactuator in position. This latter situation would be useful to retain hydraulic control of a control surface which is differentially connected to two separate actuators as shown in the Bartlett et al patent discussed earlier. In either situation the servoactuator is placed in a passive-fail mode.

Table I provides an indication of the switch operation during various channel failure conditions and details the output at comparison terminals $C_1$ through $C_4$. The "bias" is the control signal applied to the channel signal switches, the channel monitor switches, the channel transfer switches and the channel transfer monitor switches. As can be seen, with channels 1 and 2 in proper operation, the channel 1 and channel 2 signal switches and the channel 1 monitor switch are normally closed with the channel 2 transfer switch open. The channel 2 transfer monitor is in its closed position with respect to comparison terminal $C_2$ and the output of the servovalve "A" model output 104. The channel 2 transfer monitor switch is open with respect to the output 96 of rate LVDT "A". Therefore, zero or no bias is applied to any of the switches as is indicated in note 2. However, if negative logic were used, these switches could be held closed by a control signal which if interrupted would indicate a failure bias. The choice of positive or negative logic is not critical to the present invention.

It can be seen that if channel 1 fails, the output at comparison terminal $C_1$ will differ from the output at the other comparison terminal with the result that the Monitor and Control Logic will provide the necessary control signals. With a channel 1 failure, a control signal is applied to each switch causing the channel 1 signal switch to open thus preventing it from applying any control inputs to EH servovalve "A". Additionally, the channel 1 monitor switch 108 will open thus preventing the output 96 of rate LVDT "A" from being applied to comparison terminal $C_1$. The channel 2 transfer switch normally open, is closed so as to apply channel 2 servo amp and driver output 66 to the input 88 of EH servovalve "A". Accordingly, the channel 2 signal switch opens which terminates the application of the switch output to a servovalve "A" model 100. The channel 2 transfer monitor switch 116 normally connecting comparison terminal $C_2$ to model output 104, instead connects $C_2$ to the rate LVDT "A" output 96. Therefore, where $C_2$ has been a "modeled" rate indicative output prior to channel 1 failure, it is now the actual rate indicative output from EH servovalve "A" as controlled by channel 2.

In the event channel 2 fails and channel 1 remains operational, all switches remain exactly in their normal operational condition with the exception of the channel 2 signal switch whose control input causes the switch to open interrupting the application of control input 66 to the input of servovalve model 100. This prevents any signal from appearing at comparison terminal $C_2$ and thus the remaining "good" terminals continue to be compared without regard to failed channel 2 and any spurious output appearing at comparison terminal $C_2$.

If both channels have failed, the channel 1 and channel 2 signal switches will open preventing the passing on of switch outputs to the servovalve input and the servovalve model input, respectively. Additionally, the channel 2 transfer switch will remain open preventing an electrical control input 66 from being applied to the input of EH servovalve "A". The channel 1 monitor switch will open although it is unnecessary since there will be no output 96 from rate LVDT "A" (because no input is supplied to the EH servovalve "A"). Because there is no rate LVDT "A" output and there is no servovalve "A" model output, the state of channel 2 transfer monitor switch is inconsequential and there will be no output at comparison terminal $C_2$ in any event.

Should EH servovalve "A" fail or should rate LVDT "A" fail, the initial indication will be an error signal at comparison terminal $C_1$ which will be interpreted as a failure of the channel 1 electrical system. The Monitor and Control Logic will accordingly apply failure bias to all switches and route channel 2 through the channel 2 transfer switch to the input of EH servovalve "A". However, although channel 1 is thought of as a failed channel, the remaining channels 2-4 will continue to be compared in the Monitor and Control Logic for a deviant signal. Because either EH servovalve "A" or rate LVDT "A" has failed, the output at 96 which is transferred through channel 2 transfer monitor to comparison terminal $C_2$ is still a deviant signal, the Monitor and Control Logic will then determine that channel 2 has failed as well and consequently place the switches in the same condition as the channel 1 and channel 2 combination failure.

Although not shown in the table, under either circumstance of a channel 1 and 2 failure or an EH servovalve "A" or LVDT "A" failure a bypass control signal is also applied to the input 128 of the bypass valve 1 placing the actuator in its previously determined passive-fail orientation. The operation of channels 3 and 4 and their associated switches are precisely the same as for channels 1 and 2.

Figure 4:
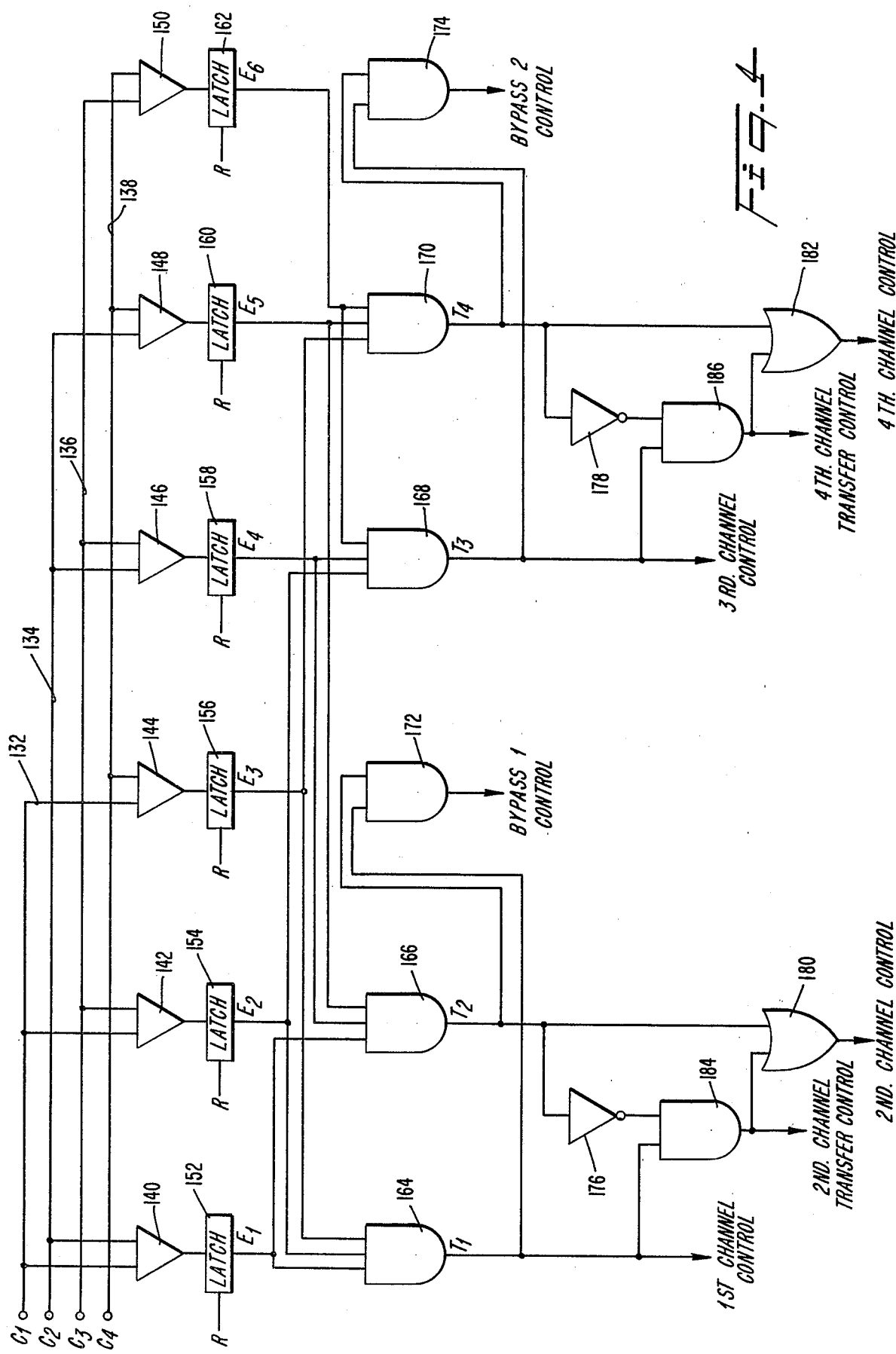
FIG. 4 is an electrical schematic depicting the monitor and control logic for one embodiment of the present invention.

FIG. 4 illustrates one embodiment of the Monitor and Control Logic which is compatible with FIG. 3. Comparison terminals $C_1$ through $C_4$ are connected to comparison buses 132, 134, 136, 138, respectively, and are selectively connected to comparators 140, 142, 144, 146, 148 and 150. One embodiment of the FIG. 4 Monitor and Control Logic utilizes comparators designated as #LM3302 available from National Semiconductor Corp., 2900 Semiconductor Drive, Santa Clara, Ca. 95051, utilizing three chips per logic.

The outputs from the various comparators are applied to respective latches, 152, 154, 156, 158, 160 and 162 which each have reset terminals marked "R" and failure signal outputs labeled $E_1$ through $E_6$. In one embodiment these are designated #74279, quad $\overline{S}-\overline{R}$ latches and are available from Texas Instrument, 6000 Denton Dr., Dallas, Tx. 75222, with two chips per logic utilized.

The failure signal outputs are applied to AND gates 164, 166, 168, 170 as shown in FIG. 4. The outputs of these AND gates have been labeled $T_1$, $T_2$, $T_3$, $T_4$, respectively. The outputs $T_1$ and $T_2$ are connected as two inputs to Bypass AND gate 172. Similarly, $T_3$ and $T_4$ are connected to the inputs of Bypass AND gate 174. The outputs of the Bypass AND gates are connected to the respective inputs of bypass valves 1 and 2. In a preferred embodiment, AND gates 164, 166, 168, 170 may be #74LS11 which are three-three input "AND" gates available from Texas Instrument at the above address with two chips per logic utilized. AND gates 172 and 174 may be #SN7409, which are two-two input "AND" gates also available from Texas Instrument as noted above.

Outputs $T_1$ and $T_3$ can be utilized directly as channels 1 and 3 control signals, respectively. Outputs $T_2$ and $T_4$ are fed both to inverters 176 and 178 and to one input of OR gates 180 and 182, respectively. The inverters in a preferred embodiment may be #SN7404, available from Texas Instrument at the above address. The OR gates in a preferred embodiment may be #SN 7432, available from Texas Instruments at the above address. The output of the inverters are connected along with outputs $T_1$ and $T_3$ to dual input AND gates 184 and 186, respectively, which AND gates in a preferred embodiment may be #SN74LS15, available from Texas Instruments.

Table 2 is a truth table showing the various logic possibilities, the signals applied to the comparison terminals, the failure signals generated by the comparators, the switching signals at terminals $T_1$ through $T_4$ and the bypass control signals utilized. Reference to this truth table while reviewing the logic for channels 1 and 2 will render the operation of the Monitor and Control Logic system obvious to one of ordinary skill in the art.

A failure input on comparison terminal $C_1$ will, through the operation of comparison bus 132, apply the failure signal to comparators 140, 142 and 144. Because there is no failure signal on terminals $C_2$, $C_3$ or $C_4$, the other terminals on comparators 140, 142 and 144 will have a normal indication. Therefore, the difference between the failure input and the normal input will produce failure signal outputs at $E_1$, $E_2$ and $E_3$. Because $E_1$, $E_2$ and $E_3$ are the three inputs to AND gate 164, there will be an output provided at $T_1$ which is the first channel control signal. As noted earlier, this causes both the channel 1 signal switch 48 and the channel 1 monitor switch 108 to open.

The output at $T_1$ is also applied to one input of AND gate 184. Because there is no output at $T_2$ (applied to inverter 176) there will be an output provided from inverter 176 to the other input of AND gate 184. Consequently, there will be a second channel transfer control signal applied to the channel 2 transfer switch 80 causing it to apply the channel 2 electrical input signal 66 to EH servovalve "A".

Additionally, the output of AND gate 184 is applied to OR gate 180 which also has an input from terminal $T_2$. With either or both inputs having a logical one signal applied thereto, OR gate 180 also provides an output which is the second channel control signal causing channel 2 signal switch 50 to open. In a preferred embodiment, the channel 2 transfer control signal is also applied to the channel 2 transfer monitor 116 causing it to change from providing modeled output 104 at terminal $C_2$ to providing rate LVDT "A" output 96 at comparison terminal $C_2$. Therefore, the logic in FIG. 4 with a failure signal at comparison terminal $C_1$ clearly accomplishes the result disclosed earlier with reference to FIG. 3.

In the event a failure signal is applied to comparison terminal $C_2$, it will simultaneously be applied by means of comparison bus 134 to comparators 140, 146 and 148 where it is compared with the signals on comparison terminals $C_1$, $C_3$, and $C_4$, respectively. The resultant comparator outputs operating through the latches will provide failure signal outputs at $E_1$, $E_4$ and $E_5$. These three outputs are connected as inputs to AND gate 166 and will consequently provide an output at $T_2$. The output at $T_2$ applied to the input of OR gate 180 ensures that there will be a second channel control signal input which is applied in FIG. 3 to the channel 2 signal switch 50, only. Accordingly, the channel 2 signal switch is opened and servovalve "A" model output 104 is terminated and thus no further output is provided at comparison terminal $C_2$. There being no output at $T_1$, there will be no first channel control signal nor will there be a second channel transfer control signal and thus the Monitor and Control Logic meets the Table 1 requirements with respect to channel 2 failure.

If both channels 1 and 2 are failed or, as noted before, if either EH servovalve "A" or rate LVDT "A" fails, there will be error signals applied to comparison terminals $C_1$ and $C_2$. This will result in failure signal outputs at $E_1$, $E_2$, $E_3$, $E_4$, and $E_5$. Even though there are failure signals on five of the six outputs of the latches, switching signals will be applied only at terminals $T_1$ and $T_2$. This will of course cause AND gate 172 to provide a bypass control signal placing the actuator in its appropriate inoperative condition. Additionally, the output at $T_1$ ensures that the channel 1 monitor switch 108 will be opened terminating the input to comparison terminal $C_1$ with the signal at $T_2$ being applied through OR gate 180 as the second channel control which opens signal switch 50 and terminates model output 104. Therefore, there will be no output provided at either comparison terminal $C_1$ or $C_2$ in accordance with Table 1.

By continuing the above analysis with reference to channels 3 and 4, it can be seen that the Monitor and Control Logic also operates properly with respect to a single or double failure of channels 3 and 4. It should be noted however that if two channels have failed, the failure of a third channel will cause termination of all control function by enabling the previously unactivated bypass valve. Thus, as shown in possibility number 12, Table 2, the fact that one of the four channels is still operational will not effect the failure signal generation or the switching signal generation and will result in bypass signals applied to both bypass valves. Of course, if all four channels have failed, the same situation will occur and both bypass valves will be operated.

FIG. 5 shows a further embodiment of the present invention in which two "rate" LVDTs are connected to each servovalve. FIG. 5 is identical to FIG. 3 with the following noted exceptions. A second rate LVDT "C" and "D" has been mechanically associated with each of servovalves "A" and "B", respectively. These LVDTs are labeled 188 and 190, respectively. Since a second LVDT is added, there is no need to supply the output of the original LVDTs, 96 and 98 to inputs of the channel 2 and 4 transfer monitors 116 and 118, respectively. Accordingly, the output of rate LVDTs "C" and "D", 192 and 194, respectively, are applied to the input of the channel 2 and channel 4 transfer monitors, respectively.

The operation of the FIG. 5 embodiment may be more clearly understood by reference to Table 3 which shows only the different operations utilized with the FIG. 5 embodiment. For failure modes not shown in Table 3, the failure modes described in Table 1 are accurate. It will be seen that the transfer monitor is normally connected to its associated model channel and provides the modeled rate indicative outputs as signals to the comparison terminals $C_2$ and $C_4$. However, upon failure of either channel 1 or LVDT "A", the transfer monitor will connect comparison terminal $C_2$ to the actual rate indicative output of servovalve "A" as indicated by rate LVDT "C". The channel 4 transfer monitor will similarly connect comparison terminal $C_4$ with actual rate indicative output of servovalve "B" as determined by rate LVDT "D". As pointed out in notes 3 and 4 to Table 3, failure of the additional LVDTs can only occur after the failure of the original LVDTs or the failure of the channel they are normally associated with.

One major advantage of the two/one (2/1) fail operational servoactuator system is that if the channel controlling the servoactuator (i.e. the active channel) fails, the failed electronic channel will be deactivated and the "model" channel selected so as to replace the failed channel. This corrective process is believed unique among servoactuator systems to date. Additionally, if the failed channel is a "model" channel, it is deactivated and prevented from being selected to replace a failed channel. Contrary to many previous servoactuator systems, two failures associated with a single hydraulic actuator are required to deactivate that actuator. Although the "rate" of servoactuator operation is measured and modeled in the preferred embodiments of this invention, other servoactuator conditions could be measured and modeled.

As have been seen, the rate LVDTs are connected mechanically to the second stage spools of the EH servovalve. In the event of a failure of a channel, the disagreement between the failed channel and the non-failed channels exceeds the permissible threshold after which the comparators provide discrete (digital) error signals. These error signals are latched and thus can be reset only after correction of the failure. This failure logic then has the capability to recognize active, model and dual (active and its associated model) channel failures and trigger the appropriate switching actions.

Although the Monitor and Control Logic is shown using comparators with AND and OR gates, the system could be designed to use Exclusive ORs with AND and OR gates for positive logic; or use Exclusive NORs with NAND and NOR gates for negative logic. For latching error signals, flip-flops may be used as are utilized in the present embodiment. A different method which may be used to mechanize the Monitor and Control Logic is the use of a Read-Only-Memory (ROM). The servo amp and driver, servoloop feedback, failure detection, correction logic and signal switching can be combined through large scale integration (LSI) into one electronic unit which is either attached to the actuator or located close to it. Another method of providing the appropriate apparatus would be to make use of a centralized digital computer to perform all or a portion of the electronic functions of the actuation system.

Regarding failures in the system, one or more failures can occur at any one time and, according to its nature, can be identified as electrical, hydraulic or mechanical. If the failure happens upstream of the electrohydraulic servovalve it will be recognized as an electrical failure. Any failure of the electrohydraulic valve or loss of hydraulic system pressure would be a hydraulic failure. Mechanism jams and openings will be considered mechanical failures.

As has been seen earlier, after any single detected and corrected electrical failure (not including failure of a rate LVDT) the redundancy level of the actuation system is automatically reconfigured to continue operation as a one-fail-operational system. After two independent electrical failures (regardless of whether they are associated with the same servoactuator or not) the actuation system is still operational either with two active channels or with one active and one model channel with the redundancy level of the system reduced to a "fail-safe" level. After the second electrical failure, the actuation system is left with only two operating electrical channels and the comparison logic cannot vote out a third failed channel since it cannot distinguish between a failed and good channel. However, if the difference between the two operating channels exceeds its permissible threshold, the Monitor and Control Logic will shut off all electrical systems and place both actuators in the either "bypass" or "blocked" mode as determined by actuator application.

Regarding hydraulic failures, the actuation system is configured to be operational after a single hydraulic failure but that operation is completely lost after a second hydraulic failure since only two hydraulic channels and two electrohydraulic servovalves are utilized in the system. Hydraulic failures can be characterized as a passive failure (one resulting from a loss of hydraulic system pressure) or a passive/active failure resulting from failure in the electrohydraulic servovalve and, depending on its failure mode (open or shut), can be a hardover or passive output indication.

The effect of failure in the Monitor and Control Logic system can vary in accordance with the failed element or elements of the logic. The failure of one comparator is not sufficient to trigger any control logic for ordering switching or switching and bypass commands. However, it may disable the detection of actuator failure therefore periodic monitoring and verification of the capabilities of the Monitor and Control Logic is appropriate. Since the failure correction logic is digital, it can easily be tested for proper operation. The failure of AND gate 164 or AND gate 168 may switch off operational channel 1 or 3, respectively, resulting in a single electrical channel failure. The control of the electrohydraulic servovalve will be transferred to its accompanying model channel 2 or 4, respectively.

The failure of AND gate 166 or AND gate 170 will result in switching off its respective model channel. If this occurs simultaneously with a failure of AND gate 164 or AND gate 168, the logic will put the associated bypass valve into the bypass position resulting in loss of operation of one hydraulic actuator. The failure of a signal switch, transfer switch, monitor switch or transfer monitor switch may cause interferences in signals between active and model channels resulting in shut down of the affected channel. Any element failure in the Monitor and Control Logic may result in no loss of channel operation but in the worst case, loss of only one active and its associated model channel which only eliminates one of the dual actuators. In any event, the system remains operational on the other active and model channels. It should be mentioned that the probability of logic failure is extremely small since periodic verification of the Monitor and Control Logic circuits would normally be accomplished.

Regarding fault tolerance, the FIG. 3 system is capable of operating after the following failures: (a) one (1) single electrical channel or component failure; (b) two (2) independent electrical channel or component failures, not including the two rate LVDTs; (c) one (1) single hydraulic failure, either due to loss of operation of an electrohydraulic servovalve or loss of hydraulic system pressure; (d) one (1) electrical channel and related electrohydraulic servovalve or hydraulic system (e.g., failure of electrical channel 1 and EH valve "A" or hydraulic system "A"); or (e) any element of the actuation control logic. This last failure may or may not cause loss in channel operation, but in the worst case, it can shut down the operation of only one active and its associated model channel.

The actuation system in FIG. 3 is not capable of operating without additional logic after undergoing one electrical and a non-related hydraulic failure (e.g., failure of channel 1 and electrohydraulic servovalve "B" or hydraulic system "B").

In the embodiment described in FIG. 5 which has dual rate LVDTs associated with each servovalve, the servovalve rate indicative outputs are still compared with model outputs but if found to differ more than a predetermined amount which is indicative of failure of that rate indicative output, the differing channel is disconnected from and the associated channel is connected to the servovalve with the result that a rate indicative output is provided by the backup LVDT which is associated with the "good" channel. Of course, if a model channel fails, the primary rate LVDT remains in operation.

The fault tolerance of the two/one (2/1) fail operation servoactuator system in FIG. 5 has the same fail operational capability as that in FIG. 3 but additionally, the failure of any single monitoring LVDT or any single electrical power supply thereto will not represent a dual failure but only a single channel failure with a corresponding improvement in operational redundancy.

Although the invention has been described relative to several specific embodiments thereof, it is not so limited and many modifications and variations thereof will be readily apparent to those skilled in the art in light of the above teachings. It is, therefore, to be understood that, within the scope of the appended claims, the invention may be practiced otherwise than as specifically described.

The embodiments of the invention in which an exclusive property or privilege is claimed are defined as follows:

TABLE 1

| FAILURE MODES | CHANNEL OPERATION CH. 1 | CH. 2 | SWITCHES CH1 SIGNAL | CH1 MONITOR | CH2 TRANSFER | CH2 SIGNAL | CH2 TRANSFER MONITOR | SIGNALS TO COMPARISON TERMINALS $C_1$ | $C_2$ |
|---|---|---|---|---|---|---|---|---|---|
| NO FAILURE BIAS | 0 | 0 | CLOSED 0 | CLOSED 0 | OPEN 0 | CLOSED 0 | TO CH. 2 0 | YES | YES |
| CH. 1 FAILED CH. 2 GOOD BIAS | 1 | 0 | OPEN 1 | OPEN 1 | CLOSED 1 | OPEN 1 | TO LVDT "A" 1 | NO | YES |
| CH. 2 FAILED CH. 1 GOOD BIAS | 0 | 1 | CLOSED 0 | CLOSED 0 | OPEN 0 | OPEN 1 | TO CH. 2 0 | YES | NO |
| CH. 1 & 2 FAILED BIAS | 1 | 1 | OPEN 1 | OPEN 1 | OPEN 0 | OPEN 1 | DON'T CARE 0 | NO | NO |
| $E_H$ VALVE "A" OR LVDT A FAILED BIAS | 1 | 1 | OPEN 1 | OPEN 1 | OPEN 0 | OPEN 1 | DON'T CARE 0 | NO | NO |

| FAILURE MODES | CH. 3 | CH. 4 | CH3 SIGNAL | CH3 MONITOR | CH4 TRANSFER | CH4 SIGNAL | CH4 TRANSFER MONITOR | $C_3$ | $C_4$ |
|---|---|---|---|---|---|---|---|---|---|
| NO FAILURE BIAS | 0 | 0 | CLOSED 0 | CLOSED 0 | OPEN 0 | CLOSED 0 | TO CH. 4 0 | YES | YES |
| CH. 3 FAILED CH. 4 GOOD BIAS | 1 | 0 | OPEN 1 | OPEN 1 | CLOSED 1 | OPEN 1 | TO LVDT "B" 1 | YES | NO |
| CH. 4 FAILED CH. 3 GOOD BIAS | 0 | 1 | CLOSED 0 | CLOSED 0 | OPEN 0 | OPEN 1 | TO CH. 4 0 | YES | NO |
| CH. 3 & 4 FAILED BIAS | 1 | 1 | OPEN 1 | OPEN 1 | OPEN 0 | OPEN 1 | DON'T CARE 0 | NO | NO |
| $E_H$ VALVE "B" OR LVDT B FAILED BIAS | 1 | 1 | OPEN 1 | OPEN 1 | OPEN 0 | OPEN 1 | DON'T CARE 0 | NO | NO |

NOTE 1:
0—GOOD
1—FAILED

NOTE 2:
0—NO BIAS
1—FAILURE BIAS

TABLE 2

| Possibilities | SIGNALS FOR LVDT'S TO COMPARATORS | | | | FAILURE SIGNALS FROM COMPARATORS | | | | | | SWITCHING SIGNALS TO SWITCHES | | | | BYPASS CONTROL | | FAILURE OF CHANNELS |
|---|---|---|---|---|---|---|---|---|---|---|---|---|---|---|---|---|---|
| | $C_1$ | $C_2$ | $C_3$ | $C_4$ | $E_1$ | $E_2$ | $E_3$ | $E_4$ | $E_5$ | $E_6$ | $T_1$ | $T_2$ | $T_3$ | $T_4$ | ACT. NO. 1 | ACT. NO. 2 | |
| 1 | 0 | 0 | 0 | 0 | 0 | 0 | 0 | 0 | 0 | 0 | 0 | 0 | 0 | 0 | 0 | 0 | 0 |
| 2 | 1 | 0 | 0 | 0 | 1 | 1 | 1 | 0 | 0 | 0 | 1 | 0 | 0 | 0 | 0 | 0 | 1 |
| 3 | 0 | 1 | 0 | 0 | 1 | 0 | 0 | 1 | 1 | 0 | 0 | 1 | 0 | 0 | 0 | 0 | |
| 4 | 0 | 0 | 1 | 0 | 0 | 1 | 0 | 1 | 0 | 1 | 0 | 0 | 1 | 0 | 0 | 0 | |
| 5 | 0 | 0 | 0 | 1 | 0 | 0 | 1 | 0 | 1 | 1 | 0 | 0 | 0 | 1 | 0 | 0 | |
| 6 | 1 | 1 | 0 | 0 | 1 | 1 | 1 | 1 | 1 | 0 | 1 | 1 | 0 | 0 | 1 | 0 | 2 |
| 7 | 1 | 0 | 1 | 0 | 1 | 1 | 1 | 1 | 0 | 1 | 1 | 0 | 1 | 0 | 0 | 0 | |
| 8 | 1 | 0 | 0 | 1 | 1 | 1 | 1 | 0 | 1 | 1 | 1 | 0 | 0 | 1 | 0 | 0 | |
| 9 | 0 | 1 | 1 | 0 | 1 | 1 | 0 | 1 | 1 | 1 | 0 | 1 | 1 | 0 | 0 | 0 | |
| 10 | 0 | 1 | 0 | 1 | 1 | 0 | 1 | 1 | 1 | 1 | 0 | 1 | 0 | 1 | 0 | 0 | |
| 11 | 0 | 0 | 1 | 1 | 0 | 1 | 1 | 1 | 1 | 1 | 0 | 0 | 1 | 1 | 0 | 1 | |
| 12 | 1 | 1 | 1 | 0 | 1 | 1 | 1 | 1 | 1 | 1 | 1 | 1 | 1 | 1 | 1 | 1 | 3 |
| 13 | 1 | 1 | 1 | 1 | 1 | 1 | 1 | 1 | 1 | 1 | 1 | 1 | 1 | 1 | 1 | 1 | 4 |

1—Failed  
0—Good

0—No Error Signals  
1—Error Signals

0—No Switching Signals  
1—Switching Signals

TABLE 3

| FAILURE MODES | CHANNEL OPERATION CH. 1 | CHANNEL OPERATION CH. 2 | SWITCHES CH1 SIGNAL | SWITCHES CH1 MONITOR | SWITCHES CH2 TRANSFER | SWITCHES CH2 SIGNAL | CH2 TRANSFER MONITOR | SIGNALS TO COMPARISON TERMINALS $C_1$ | SIGNALS TO COMPARISON TERMINALS $C_2$ |
|---|---|---|---|---|---|---|---|---|---|
| CH. 1 FAILED CH2. GOOD BIAS | 1 | 0 | OPEN 1 | OPEN 1 | CLOSED 1 | OPEN 1 | TO LVDT "C" 1 | NO | YES |
| LVDT "A" FAILED BIAS | 1 | 1 | OPEN 1 | OPEN 1 | CLOSED 1 | OPEN 1 | TO LVDT "C" 1 | NO | YES |
| LVDT "C" FAILED (NOTE 3) BIAS | 1 | 1 | OPEN 1 | OPEN 1 | OPEN 0 | OPEN 1 | DON'T CARE 0 | NO | NO |

| FAILURE MODES | CHANNEL OPERATION CH. 3 | CHANNEL OPERATION CH. 4 | SWITCHES CH3 SIGNAL | SWITCHES CH3 MONITOR | SWITCHES CH4 TRANSFER | SWITCHES CH4 SIGNAL | CH4 TRANSFER MONITOR | SIGNALS COMPARISON TERMINALS $C_3$ | SIGNALS COMPARISON TERMINALS $C_4$ |
|---|---|---|---|---|---|---|---|---|---|
| CH. 3 FAILED CH. 4 GOOD BIAS | 1 | 0 | OPEN 1 | OPEN 1 | CLOSED 1 | OPEN 1 | TO LVDT "D" 1 | NO | YES |
| LVDT B FAILED BIAS | 1 | 1 | OPEN 1 | OPEN 1 | CLOSED 1 | OPEN 1 | TO LVDT "D" 1 | NO | YES |
| LVDT D FAILED (NOTE 4) BIAS | 1 | 1 | OPEN 1 | OPEN 1 | OPEN 0 | OPEN 1 | DON'T CARE 0 | NO | NO |

NOTE 1:  
0—GOOD  
1—FAILED

NOTE 2:  
0—NO BIAS  
1—FAILURE BIAS (NOTE 3)  
FAILURE OF LVDT C ONLY OCCURS AFTER THE FAILURE OF CHANNEL 1 OR LVDT A  
(NOTE 4)  
FAILURE OF LVDT D ONLY OCCURS AFTER THE FAILURE OF CHANNEL 3 OR LVDT B

We claim:

1. A redundant servoactuator system, comprising:
first and second hydraulic servoactuators connected to a positionable load;
a hydraulic control circuit for the servoactuators including a separate hydraulic channel for each channel for the first servoactuator, and a second electrohydraulic servovalve in the channel for the second servoactuator; and
electric control means for said servovalves comprising four signal processing channels, a first one of which is connected to provide an electrical input signal for the first servovalve, and a second one of which is connected to provide an electrical input signal for the second servovalve,
a first valve position sensor connected to the first servovalve and operable to produce a first rate indicative output corresponding to the position of the first servovalve,
a second valve position sensor connected to the second servovalve and operable to produce a second rate indicative output corresponding to the position of the second servovalve,
a first electronic model of the first servovalve having an electrical input from a third one of said channels and operable to produce a third rate indicative output reflective of the output which would be expected from the first valve position sensor in response to an electrical input equal to the electrical input of the said first model, a second electronic model of the second servovalve having an electrical input from the fourth channel and operable to produce a fourth rate indicative output reflective of the output which would be expected from the second valve position sensor in response to an electrical input equal to the electrical input of the said second model, and means for comparing said four rate indicative outputs with each other and for providing a failure signal if one of said rate indicative outputs differs from the others of said rate indicative outputs by a predetermined amount indicative of failure of the signal processing channel that is associated with said differing rate indicative output.

2. The servoactuator system according to claim 1, further including disabling means, responsive to said failure signal, for disabling the channel associated with said differing rate indicative output.

3. The servoactuator system according to claim 2, further including second means for comparing the remaining three rate indicative outputs when said differing rate indicative output is disabled and for providing a second failure signal if one of said remaining three rate indicative outputs differs from the other two of said remaining three rate indicative outputs by a predetermined amount indicative of failure of the channel associated with the second differing rate indicative output.

4. The servoactuator system according to claim 3, further including second disabling means, responsive to said second failure signal, for disabling the channel associated with said second differing rate indicative output.

5. The servoactuator system according to claim 4, further including third means for comparing the remaining two rate indicative outputs when said two differing rate indicative outputs are disabled, and for providing a third failure signal if one of said remaining two rate indicative outputs differs from the other of said remaining two rate indicative outputs by a predetermined amount indicative of failure of the channel associated with said differing one of said remaining two rate indicative outputs; and third means, responsive to said third failure signal, for deactivating all four signal processing channels.

6. The servoactuator system according to claim 5, including means, responsive to said third failure signal, for placing said servoactuators in a passive-fail mode.

7. The servoactuator system according to claim 3, further including means, responsive to failure signals indicative of failure of both channels associated with one servoactuator, for placing said one servoactuator in a passive-fail mode.

8. In a redundant servoactuator system having at least two active and two model signal processing channels, for a total of four channels, having outputs for actuating two force summed hydraulic servoactuators, said servoactuators for positioning a positionable load in response to an electrical input to said four channels, an improvement comprising:

means, associated with said two active channels and responsive to said electrical input signal supplied thereto, for independently and actively controlling the rate of operation of said two servoactuators and for providing two rate indicative outputs, one output associated with each one of said two servoactuators;

means, associated with said two model channels and responsive to said electrical input signal supplied thereto, for modeling said means for controlling and for providing two modeled rate indicative outputs, each modeled rate indicative output similar to the expected rate indicative output generated by said controlling means if said electrical input signal is applied to said controlling means through one of said two active channels; and means for comparing said four rate indicative outputs with each other and for providing a first failure signal if one of said rate indicative outputs differs from the other three of said rate indicative outputs by a predetermined amount indicative of failure of the channel associated with said differing rate indicative output.

9. The servoactuator system according to claim 8, including first means, responsive to said first failure signal, for disabling the channel associated with said differing rate indicative output.

10. The servoactuator system according to claim 9, including second means for comparing the remaining three rate indicative outputs when the differing rate indicative output is disabled, and for providing a second failure signal if one of said remaining three rate indicative outputs differs from the other two by a predetermined amount indicative of failure of the channel associated with said second differing rate indicative output.

11. The servoactuator system according to claim 10, including second means, responsive to said second failure signal, for disabling the channel associated with said second differing rate indicative output.

12. The servoactuator system according to claim 11, further including third means for comparing the remaining two rate indicative outputs when said two differing rate indicative outputs are disabled and for providing a third failure signal if one of said remaining two rate indicative outputs differs from the other of said remaining two rate indicative outputs by a predetermined amount indicative of failure of the channel associated with said differing one of said two remaining rate indicative outputs; and third means, responsive to said third failure signal, for disabling all four signal processing channels.

13. The servoactuator system according to claim 12, including means responsive to said third failure signal, for placing both of said servoactuators in a passive-fail mode.

14. The servoactuator system according to claim 10, wherein one model channel and one active channel are associated with each servoactuator, said system including means, responsive to signals indicative of failure of both model and active channels associated with one servoactuator, for placing said one servoactuator in a passive-fail mode.

15. In a servoactuator system having at least an active and a model signal processing channel, each channel with an output, said outputs for actuating at least one servoactuator, said at least one servoactuator for positioning a positionable load in response to an electrical input signal suppled to said two signal processing channels, an improvement comprising:

means, associated with said active signal processing channel and responsive to said electrical input signal supplied thereto, for actively controlling the rate of operation of said servoactuator, and for providing an actual servoactuator condition output;

means, associated with said model signal processing channel and responsive to said electrical input signal supplied thereto, for modeing said controlling means and for providing a modeled servoactuator condition output, said modeled servoactuator condition output generated by said controlling means when said electrical input signal is applied to said active signal processing channel;

means, responsive to said actual servoactuator condition output and said modeled servoactuator condition output, for determining failure of one of said signal processing channels if said outputs vary by more than a predetermined amount, said determining means further providing an output indicative of which of said channels has failed; and means, responsive to said determining means output indicative of active signal processing channel failure, for disconnecting said active signal processing channel output from its associated controlling means for connecting said model signal processing channel output to its associated controlling means, said model signal processing channel then becoming an active channel usable for continuing operation of the servoactuator, said disconnecting means, responsive to said determining means output indicative of model signal processing channel failure, for disconnecting said model signal processing channel.

16. A servoactuator system according to claim 15, wherein said system includes two active signal processing channels and two model signal processing channels and two servoactuators, one active and one model signal processing channel associated with each servoactuator, said system including two controlling means, one associated with each servoactuator and two modeling means, one associated with each servoactuator, wherein said determining means comprises means for comparing said actual and said modeled servoactuator condition outputs, said comparing means further providing an output indicative of failure of a channel associated with a servoactuator condition output which differs from the other servoactuator condition outputs by more than a predetermined amount.

17. In a servoactuator system according to claim 16, wherein said determining means, after determining a first failure, continues comparing the remaining three servoactuator condition outputs and providing a further output indicative of failure of a second channel, said second channel associated with one of said servoactuator condition outputs which differs by more than a predetermined amount from the others of said remaining three servoactuator condition outputs.

18. The servoactuator system according to claim 17, further including means for placing one of said servoactuators in a passive-fail mode in response to a dual channel failure signal, wherein said disconnecting means provides a dual channel failure signal to said placing means when both channels associated with one servoactuator have failed.

19. In a servoactuator system according to claim 18, wherein said disconnecting means provides dual channel failure signals to placing means associated with each servoactuator in the event three or more signal processing channels have failed.

20. A servoactuator system having dual redundant servoactuators for positioning a positionable load in response to an electrical input signal, said system comprising:

a first servoactuator;
a second servoactuator;
first means, having at least two inputs, for controlling rate of movement of said first servoactuator and providing a rate indicative output;
second means, having at least two inputs, for controlling rate of movement of said second servoactuator and providing a rate indicative output;
first channel means, responsive to a first disabling control signal and to said electrical input signal, for normally applying a first channel positioning signal to one of said inputs of said first rate controlling means;
second channel means, responsive to a second disabling control signal and to said electrical input signal, for normally applying a second channel positioning signal to an output;
second channel transfer means, responsive to a second channel transfer signal, for connecting said second channel positioning signal output to the other of said inputs of said first rate controlling means;
third channel means, responsive to a third disabling control signal and to said electrical input signal, for normally applying a third channel positioning signal to one of said inputs of said second rate controlling means;
fourth channel means, responsive to a fourth disabling control signal and to said electrical input signal, for normally applying a fourth channel positioning signal to an output;
fourth channel transfer means, responsive to a fourth channel transfer signal, for connecting said fourth channel positioning signal output to the other of said inputs of said second rate controlling means; and
logic means for comparing said rate indicative outputs and said second and fourth channel positioning signal outputs to each other, and for providing one of said disabling control signals when one of said outputs differs from the remaining three outputs by a predetermined amount indicative of failure of the channel associated with said one differing output;
(a) when said first rate indicative output is said differing output, said logic means providing said first disabling control signal to said first channel means, said logic means providing said second channel transfer signal to said second channel transfer means, said logic means including means for treating said first rate indicative output as said second positioning signal output when said second channel transfer signal is applied to said second channel transfer means;
(b) when said second channel means positioning signal output is said differing output, said logic means providing said second disabling control signal to said second channel means;
(c) when said second rate indicative output is said differing output, said logic means providing said third disabling control signal to said third channel means, said logic means providing said fourth channel transfer signal to said fourth channel transfer means, said logic means including means for treating said second rate indicative output as said fourth positioning signal output when said fourth channel transfer signal is applied to said fouth channel transfer means;
(d) when said fourth channel means positioning signal output is said differing output, said logic means providing said fourth disabling control signal to said fourth channel means; and said logic means further including means for comparing said remaining three outputs when said one output indicates failure of its associated channel and for providing further control signals in accordance with (a), (b), (c) and (d) when one of said remaining three outputs differs from the other two of said remaining three outputs by a predetermined amount indicative of failure of a channel associated with said one of said remaining three outputs.

21. A servoactuator system according to claim 20, wherein said logic means further includes means for comparing said remaining two outputs in the event of failure of two channels, and for providing a failure signal when one of said remaining two outputs differs from the other of said remaining two outputs by a predetermined amount indicative of failure of a channel associated with said one of said remaining two outputs.

22. A servoactuator system according to claim 21, further including bypass means, responsive to said control signals, for placing each of said servoactuators in its passive failure mode when said control signals are indicative of failure of two channels associated with a single actuator or failure of three of the four channels in the system.

23. A servoactuator system according to claim 21, wherein said logic means includes:

first modeling means, responsive to said second channel positioning signal, for providing a first modeled rate indicative output, said output being the electronic model of the expected rate indicative output of said first rate controlling means having said second channel positioning signal applied as an input thereto; and second modeling means, responsive to said fourth channel positioning signal, for providing a second modeled rate indicative output, said output being the electronic model of the expected rate indicative output of said second rate controlling means having a fourth channel positioning signal applied as an input thereto.

24. A servoactuator system according to claim 23, wherein said logic means further includes comparator means for comparing said first and second rate indicative outputs and said first and second modeled rate indicative outputs and for providing signals when one of said rate indicative outputs differs from the remaining three rate indicative outputs by a predetermined amount, said signals indicative of failure of the channel associated with said one differing rate indicative output, said comparing means signals comprising said control and transfer signals.

25. A servoactuator system according to one of claims 20 through 24, wherein said first disabling control signal and said second channel transfer signal comprise the same electrical signal, and said third disabling control signal and said fourth channel transfer signal comprise the same electrical signal.

26. A servoactuator system according to one of claims 23 through 24, wherein said means for treating in said logic means comprises:

first and second transfer monitor switches, said first transfer monitor switch associated with said first and second channel means and said second transfer monitor switch associated with said third and fourth channel means, respectively, each of said transfer monitor switches having two inputs connected to the outputs of their associated channel means, each of said transfer monitor switches including a control input, and an output, said first and second transfer monitor switch output normally is reflective of the output of said first and second modeling means, respectively, and, upon application of a transfer monitor control input to either transfer monitor switch, the output of said transfer monitor switch will be reflective of the rate indicative output of said controlling means.

27. In a redundant servoactuator system having at least two signal processing channels having outputs for actuating at least one servoactuator, said servoactuator providing an actuator condition output signal, a method of operating said at least one servoactuator comprising the steps of:

applying an electrical input signal to both signal processing channels;

controlling said servoactuator with one of said signal processing channels;

modeling with the other of said signal processing channels, the expected actuator condition output;

comparing the actual actuator condition output with the modeled actuator condition output;

upon failure of a channel determining which of said signal processing channels has failed; and disconnecting said failed signal processing channel and, if said failed channel is said one of said signal processing channels connecting the output of the other of said signal processing channels to the servoactuator and continuing to operate the servoactuator by use of said other channel.

28. A redundant servoactuator system having at least two force summed electrohydraulic servoactuators and at least four signal processing channels whose outputs control two servoactuators, said servoactuators for positioning a positionable load in response to an electrical input signal applied to the signal processing channels, a method of operating said servoactuators comprising the steps of:

providing four rate indicative outputs, each output associated with one of said four channels;

comparing said four rate indicative outputs with each other;

providing a first failure signal if one of said rate indicative outputs differs from the others of said rate indicative outputs by a predetermined amount indicative of failure of said channel associated with said one rate indicative output;

disabling said channel associated with said one of said rate indicative output; and continuing operation of the servoactuators by use of two of the remaining channels.

29. A method of operating said servoactuators according to claim 28, wherein after said step of disabling said one of said rate indicative outputs, there are further included the steps of:

comparing the remaining three rate indicative outputs when said one rate indicative output is disabled:

providing a second failure signal if one of said remaining three rate indicative outputs differs from the other two of said remaining three rate indicative outputs by a predetermined amount indicative of failure of said channel associated with said one of said remaining three rate indicative outputs; and disabling said channel associated with said one of said remaining three rate indicative outputs.

30. A method of operating said servoactuators according to claim 29, further including after the second disabling step, the additional step of passively disabling any servoactuator having two failed signal processing channels associated therewith.

31. A method of operating said servoactuators according to claim 29 or 30, including after the second disabling step, the additional steps of:
comparing the remaining two rate indicative outputs when two of said rate indicative outputs are disabled;
providing a third failure signal if one of said remaining two rate indicative outputs differs from the other of said remaining two rate indicative outputs by a predetermined amount indicative of failure of said channel associated with said one of said two remaining rate indicative outputs; and
passively disabling both servoactuators upon failure of any three of said four signal processing channels.

32. A redundant servoactuator system having at least four signal processing channels whose outputs control two servoactuators, said servoactuators for positioning a positionable load in response to an electrical input signal applied to the signal processing channels, each servoactuator having an active and a model signal processing channel associated therewith, each servoactuator further providing a rate indicative output, each model signal processing channel providing a modeled rate indicative output, a method of operating said servoactuators comprising the steps of:
comparing said four rate indicative outputs;
providing a first failure signal if one of said rate indicative outputs differs from the others of said rate indicative outputs by a predetermined amount indicative of failure of said channel associated with said one rate indicative output;
when one of said active signal processing channels has failed, applying the output from a modeled signal processing channel to control its associated servoactuator;
disregarding the modeled rate indicative output from said model signal processing channel
comparing the remaining three rate indicative outputs;
when said model signal processing channels are the failed channel, disregarding the modeled rate indicative output therefrom; and
comparing the remaining three rate indicative outputs.

33. A servoactuator system according to one of claims 23 through 24, wherein said first and second controlling means each provide first and second rate indicative outputs and said logic means normally compares said first rate indicative output and said modeled rate indicative outputs, each of said transfer monitor switches having two inputs, one input of which is connected to its respective modeled rate indicative output and the other input of which is connected to its respective second rate indicative outputs, each of said transfer monitor switches including a control input and an output, said first and second transfer monitor switch output normally reflects said first and second modeled rate indicative outputs, respectively, and, upon application of a transfer monitor control input to either transfer monitor switch, the output of said transfer monitor switch will be reflective of the second rate indicative output of said controlling means.

34. The servoactuator system according to one of claims 20-24, wherein said first and second controlling means include first and second linear variable differential transformers (LVDT) for providing said rate indicative outputs, respectively.

35. A servoactuator system according to claim 33, wherein each of said first and second controlling means includes two linear variable differential transformers (LVDTs) for providing said first and second rate indicative outputs for each of said controlling means.

* * * * *

UNITED STATES PATENT AND TRADEMARK OFFICE
CERTIFICATE OF CORRECTION

PATENT NO. : 4,345,191
DATED : August 17, 1982
INVENTOR(S) : Imre J. Takats and Charles C. Chenoweth It is certified that error appears in the above-identified patent and that said Letters Patent are hereby corrected as shown below:

Column 2, 9th and 10th lines from bottom, "geneated" should be --generated--.

Claim 1, column 15, --servoactuator, a first electrohydraulic servovalve in the-- should be added between lines 59 and 60.

Signed and Sealed this

Twentieth Day of December 1983

[SEAL]

Attest:

GERALD J. MOSSINGHOFF

Attesting Officer

Commissioner of Patents and Trademarks